United States Patent
Atreya et al.

(10) Patent No.: US 9,723,493 B2
(45) Date of Patent: Aug. 1, 2017

(54) PLAN-ASSISTED WIRELESS ACCESS POINT CONFIGURATION

(71) Applicant: Avaya Inc., Basking Ridge, NJ (US)

(72) Inventors: Vivek L Atreya, Bangalore (IN);
Shashi H Ankaiah, Bangalore (IN);
Seemant Choudhary, Fremont, CA (US)

(73) Assignee: Avaya Inc., Santa Clara, CA (US)

(*) Notice: Subject to any disclaimer, the term of this patent is extended or adjusted under 35 U.S.C. 154(b) by 363 days.

(21) Appl. No.: 14/033,337

(22) Filed: Sep. 20, 2013

(65) Prior Publication Data

US 2015/0085745 A1   Mar. 26, 2015

(51) Int. Cl.
| H04W 4/00 | (2009.01) |
| H04W 16/18 | (2009.01) |
| H04W 24/02 | (2009.01) |
| H04W 72/04 | (2009.01) |
| H04W 24/04 | (2009.01) |

(52) U.S. Cl.
CPC .......... *H04W 16/18* (2013.01); *H04W 24/02* (2013.01); *H04W 24/04* (2013.01); *H04W 72/0453* (2013.01)

(58) Field of Classification Search
CPC ..... H04W 16/18; H04W 24/02; H04W 24/04; H04W 72/0453
See application file for complete search history.

(56) References Cited

U.S. PATENT DOCUMENTS

| 6,535,740 | B1* | 3/2003 | Kosugi | H04W 52/40 370/331 |
| 7,474,895 | B1* | 1/2009 | Jiang | H04W 72/0453 455/436 |
| 7,688,795 | B2* | 3/2010 | Doshi et al. | 370/338 |
| 8,254,357 | B2* | 8/2012 | Bheda | H04W 24/04 370/331 |
| 2005/0048963 | A1* | 3/2005 | Kubler | H04W 16/06 455/423 |
| 2008/0084855 | A1* | 4/2008 | Rahman | H04L 67/34 370/342 |
| 2008/0119191 | A1* | 5/2008 | Feigen | H04W 24/02 455/437 |
| 2010/0184421 | A1* | 7/2010 | Lindqvist | H04J 11/0069 455/418 |
| 2011/0130137 | A1* | 6/2011 | Sanders | H01Q 1/246 455/424 |
| 2012/0046063 | A1* | 2/2012 | Chande et al. | 455/522 |

(Continued)

*Primary Examiner* — Jutai Kao
(74) *Attorney, Agent, or Firm* — IP Spring

(57) ABSTRACT

Implementations relate to configuring wireless access points in a wireless network. In some implementations, a method includes selecting, from a plurality of wireless access points in a communication network, a configuring subset of wireless access points and a different compensating subset of wireless access points. New settings are applied to the compensating subset of wireless access points to change a physical coverage of wireless communication provided by the compensating subset, thus at least partially compensating for disabled wireless communication of the configuring subset. The method disables wireless communication provided by the configuring subset, and configures the disabled configuring subset of wireless access points.

20 Claims, 5 Drawing Sheets

(56) References Cited

U.S. PATENT DOCUMENTS

| | | | |
|---|---|---|---|
| 2013/0079005 A1* | 3/2013 | Watanabe | H04W 36/0083 455/435.1 |
| 2013/0225183 A1* | 8/2013 | Meshkati | H04W 52/18 455/448 |
| 2014/0301328 A1* | 10/2014 | Yacovitch | H04W 16/02 370/329 |
| 2015/0049616 A1* | 2/2015 | Ho | H04W 24/02 370/252 |
| 2015/0105072 A1* | 4/2015 | Zhu | H04W 24/02 455/434 |

* cited by examiner

PLAN-ASSISTED WIRELESS ACCESS POINT CONFIGURATION

TECHNICAL FIELD

Implementations of the disclosure relate generally to communication networks and more specifically to configuration of wireless communication networks.

BACKGROUND

Communication networks are widely used to provide communication between different computer systems and other electronic devices. Wireless communication networks offer increased convenience to client devices, such as computers, phones, and other devices, by allowing network communications between these devices without the need for wired connections. A number of wireless access points connected to a network can be deployed to transmit and receive wireless communication signals between the access points and client devices over a desired physical coverage area. Some wireless networks can include hundreds or thousands of access points to service client devices.

In many wireless networks, however, configuration of wireless access points may become problematic. For example, installing an updated software image on access points can cause significant downtime of one or more sections of the wireless network as individual access points are brought down and temporarily disabled to install the upgrade and restart. During this downtime, client devices needing to access the network may not be able to do so, causing issues in environments in which timely network access is desired and/or critical.

SUMMARY

Implementations of the present disclosure relate to configuring wireless access points in a wireless network. In some implementations, a method includes selecting, from a plurality of wireless access points in a communication network, a configuring subset of wireless access points and a different compensating subset of wireless access points. New settings are applied to the compensating subset of wireless access points. The new settings change a physical coverage of wireless communication provided by the compensating subset of wireless access points, to at least partially compensate for a disabling of wireless communication provided by the configuring subset. The method causes disablement of the wireless communication provided by the configuring subset of wireless access points, and causes configuration of the disabled configuring subset of wireless access points.

Various implementations and examples of the above method are described. For example, the configuring subset can be selected such that wireless access points having immediately-neighboring wireless physical coverages are not both included in the configuring subset. The new settings can be sent from a wireless access point controller to the compensating subset of wireless access points, e.g., via a connection separate from wireless channels used to communicate wireless data traffic. The new settings can include new signal power settings and/or new operating communication channels for one or more wireless access points in the compensating subset. The new settings can be determined by simulating the disablement of the wireless communication of the configuring subset of wireless access points, determining the loss of physical coverage caused by the disablement, and determining a compensation from the compensating subset.

The method can include accessing a signal coverage map to determine the physical coverage of the wireless communication provided by the plurality of wireless access points using settings different than the new settings. The disabling of wireless communication can include gradually fading the power level of wireless signals provided by the configuring subset of wireless access points, and/or a restart of the wireless access points in the disabled configuring subset. The method can include sending a software upgrade to the configuring subset, and/or causing a reset of the wireless access points in the configuring subset to cause new parameters to be applied.

The method can include causing previous settings, different than the new settings, to be applied to the compensating subset of wireless access points after the configuring subset of wireless access points has been configured. Further, the method can configure additional wireless access points by determining a new configuring subset of wireless access points that includes none of the wireless access points in the configuring subset, determining a new compensating subset of wireless access points that are not included in the new configuring subset, and repeating portions of the method for the new configuring subset and new compensating subset.

In some implementations, a computer program product includes a computer readable medium including program instructions to be implemented by a device connected to a communication network, the program instructions for performing similar features as in the above method.

In some implementations, a device includes a memory and at least one processor operative to access the memory and perform operations including similar features as in the above method.

DETAILED DESCRIPTION

Various implementations described herein enable configuration of wireless access points without requiring downtime in wireless service to client devices in coverage areas of the wireless network. A subset of configuring wireless access points are selected to be configured, and a different subset of compensating wireless access points are set up with different settings to compensate for any holes in coverage created by a disabling of the configuring subset during configuration. A plan-assisted configuration allows a wireless communication network to provide continuous wireless network service to client devices during configuration of all the wireless access points of a wireless network, thus preventing or reducing costly and inefficient downtime periods.

Figure 1:
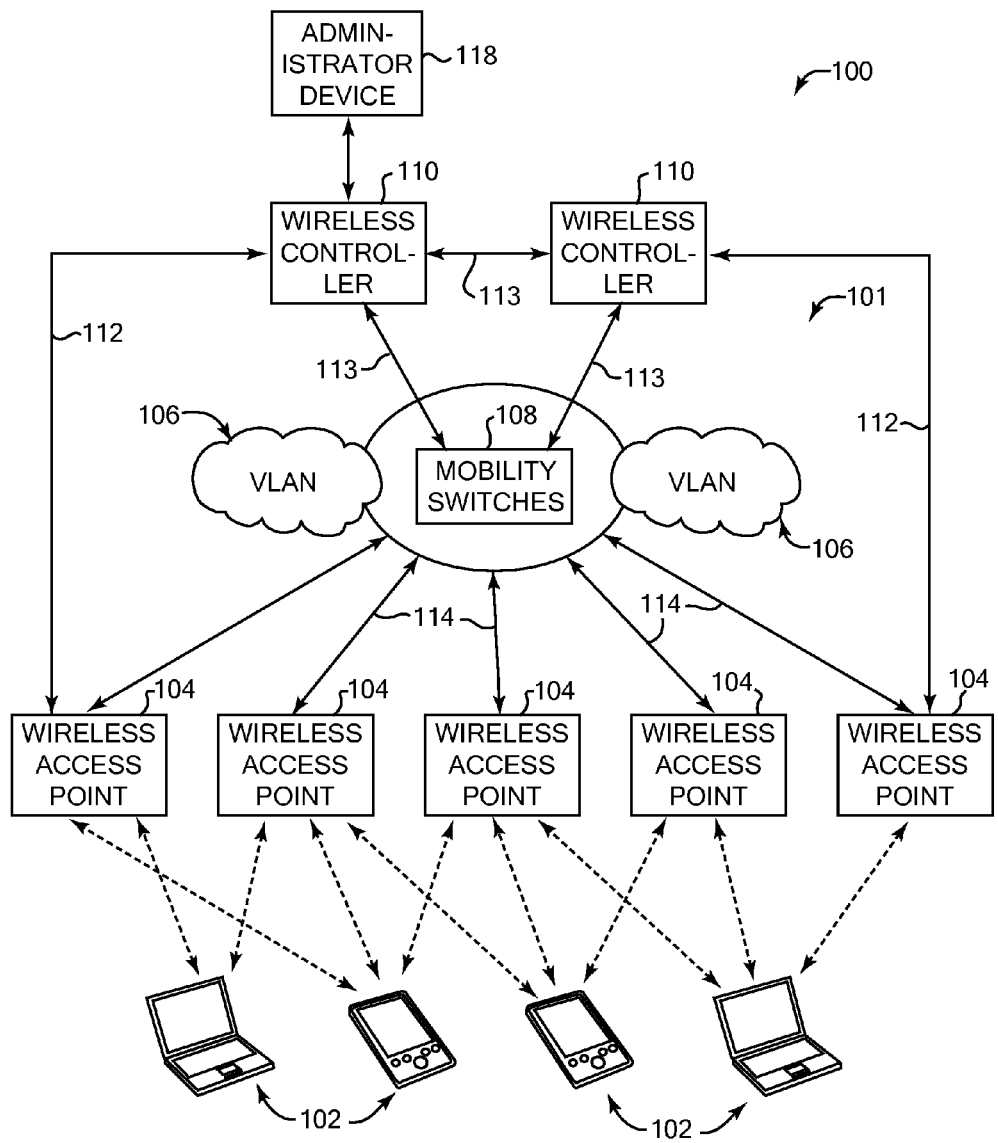
FIG. 1 is a block diagram depicting an example network system which can be used with some implementations described herein.

FIG. 1 is a block diagram of an example network system 100 which can be used with some implementations described herein. The network system 100 can include a network 101 providing communication links between multiple devices connected to the network. Network 101 can include any types of networks that connects devices, such as a wide area network (WAN), local area network (LAN), wireless network, or others types of networks. Any one or more various networking standards can be used for network 101, such as Ethernet, common wireless networking standards, etc. In various implementations described herein, a wireless network is used for at least a portion of the network 101.

Client devices 102 can be operated by users and can communicate with other client devices 102 as well as other devices via the network 101. In various implementations, the client devices 102 can include wireless transmitters and receivers (e.g., transceivers, or radios) that allow them to communicate signals wirelessly with other devices that also have this capability. Each client device 102 can be any of a variety of types of devices. For example, in some implementations, client devices 104 can be implemented as desktop computers, laptop computers, tablet computers, portable devices, cell phones, media players, wearable devices (e.g., glasses device, wristwatch device, etc.), entertainment devices (television, disc player, stereo), mainframe computer, peripherals (printer, scanner, sensors), or other electronic devices.

Wireless access points 104 are devices that allow other wireless-capable devices to connect to a communication network and communicate with each other. The wireless access points 104 can transmit and receive wireless communication signals to and from other devices having compatible wireless communication functionality. In the example system 100, the wireless access points 104 can transmit wireless signals to the client devices 102 via one or more wireless protocols, and can receive wireless signals from client devices 102 via such protocols. Some examples of current suitable wireless protocols include those protocols defined under IEEE 802.11. Other protocols can also be used. Thus, the client devices can communicate all of their data traffic via wireless access points 104 in range of the clients' transmitters and receivers.

Wireless access points 104 are connected to other network devices provided in network 101. The access points 104 can be used to communicate data traffic to and from client devices 102 through the network. The wireless access points 104 can send data traffic from client devices 102 to other network devices to send the traffic to the desired network destination, and also receive data traffic from other devices via the network devices to provide to the client devices 102. Any of a variety of different wireless network topologies, devices, and functions can be used. For example, in some implementations, multiple virtual local area networks (VLANs) 106 can be provided, which provide partitions for client devices connected to the network 101 into distinct domains that are isolated from each other. Some implementations can provide communication between VLANs using mobility switches 108. For example, the wireless access points 104 can be connected (e.g., via wired connection such as Ethernet to mobility switches 108 which can implement mobility tunnels allowing client devices 102 to communicate via particular VLANs 106 associated with particular wireless access points 104 with which the client devices 102 are communicating. Various implementations can include different kinds of switches, hubs, routers, and other types of network devices in the network 101.

One or more wireless access controllers 110 can be included in system 100. Controllers 110 are devices used to manage, control and/or configure wireless access points 104, mobility switches 108, VLANs 106, and/or other network devices or structures connected to the network 101. In some implementations, multiple controllers 110 can be used as shown, where each controller 110 can be associated with a different VLAN 106 and/or set of wireless access points 104. In some examples, if a client device 102 communicates with a wireless access point 104 that is associated with a first controller 110, and the client device then "roams" to communicate with a different wireless access point 104 associated with a second controller 110, the first controller can provide the necessary information to the second controller to maintain the client connection.

In some described implementations, the wireless controllers 110 can configure the wireless access points 104 with changed or new functionality. For example, the controllers 110 can send (or cause to be sent) a firmware image or other software image or code as an upgrade to one or more selected wireless access points 104. Controllers 110 can also select or apply particular settings or functions on wireless access points 104 or other devices connected to the network. Controllers 110 also receive information from connected devices including wireless access points 102, such as status information regarding the settings and status of various functions of the wireless access points (e.g., data communication, transmission, reception, readiness, etc.). In some implementations, communication between the controllers 110 and the wireless access points 102 can be provided on dedicated control connections 112 (which can connect appropriate controllers 110 to all the wireless access points 104), where the connections 112 can be separate from the connections 114 used to transmit client data traffic between the wireless access points 104 and VLANs 106. In other implementations, the wireless controllers 110 can communicate with the wireless access points 104 via connections 114 instead of or in addition to communication over connections 112. Controllers 110 can also communicate control information with mobility switches 108 and with each other via other control connections 113.

In some example implementations, an initializing wireless access point 104 discovers a wireless controller 110 using a discovery protocol and establishes a control channel 112 with the controller 110 (e.g., associates with one of the controllers). During its operation, the access point 104 reports monitoring information to the associated controller 110. An access point 104 may also (e.g., periodically) scan the air and report any neighboring access points to its associated controller 110. For example, the access point can collect the operating channel and receiver power information of each neighboring access point it sees and send it to its controller 110.

The configuration for the access point 104 is defined on the controller 110 and can be sent to the access point after the access point associates with controller 110 over the control channel 112. For example, access point profiles stored by the controller 110 can be used to define the access point configuration for different access points. The access point 104 is configured according to the received configuration from the controller, such as a set of configuration instructions.

In various example implementations, the configuration can include a software upgrade as described above. The upgrade image can be stored on storage local to the associated controller 110 or can be stored on one or more separate servers in communication with the wireless access point 104 to be configured. For example, a wireless access point can download a software image from a server using a standard protocol such as HTTP or TFTP. The upgrade image can be controlled and triggered by a wireless controller 110, such that the controller sends a request to the wireless access point 104 to download and install the software image. For example, the access point 104 can save the received software image in a non-volatile memory partition. After the access point has downloaded the image, it restarts (e.g., reboots) to initialize and operate with the new image. In some implementations, the restart can be triggered by another command from the controller which allows decoupling of the download activity from the restart activity of the access point. For example, a restart can be triggered after all of the access points targeted for the upgrade have indicated that they have successfully downloaded the software image. After restart, the access point can go through the discovery procedure to find and establish a connection with a wireless controller 110. At that point, the access point 104 is ready to service client data traffic. In some other types of configuration, the wireless access point can receive new parameters, such as new radio parameters, from a controller 110 or from another device connected to the network. Applying some of these parameters may also require the access point to restart and re-associate with a wireless controller.

During the time of restarting, and during the time of management by the controller 110 (e.g., the time to discover a controller, associate with a controller, and establish a connection with the controller), the access point typically cannot accept or maintain client connections or route client data traffic. Thus, the wireless communication provided by the access point is typically disabled during much of its configuration, causing downtime for its wireless service. For example, in configurations involving a new software image, some implementations of an access point may disconnect client devices during download of the image and during restarting of the access point to run the new image. In other implementations, an access point can download and save software images in local storage while client devices are actively connected, but after the decision to boot the access point into a new image is triggered, the access point loses all of its client connections until it restarts with the newly active image. Other types of configuration also may cause downtime. For example, in some implementations, if radio parameters are modified during operation or existing networks are deleted, a disassociation of currently active clients can be triggered (e.g., bringing down and bringing up of radios) on the associated radio or network.

An administrator device 118 connects to one or more of the wireless controllers 110 to communicate with the controller. For example, the administrator device 118 can receive status information regarding the controller 110 and/or the network 101. The administrator device 118 can also manage the network by sending commands and data to various network devices such as the controllers 110 to configure the controller and/or configure other devices connected to the network 101 via the controller 110. An administrator or other user operating the administrator device 118, for example, can send a command to cause a configuration of designated access points as described above. The administrator device 118 can be connected to the network 101 via any type of network connection. For example, in some implementations, a wireless management service can use a web-based front end to provide a user access to the network.

Figure 2:
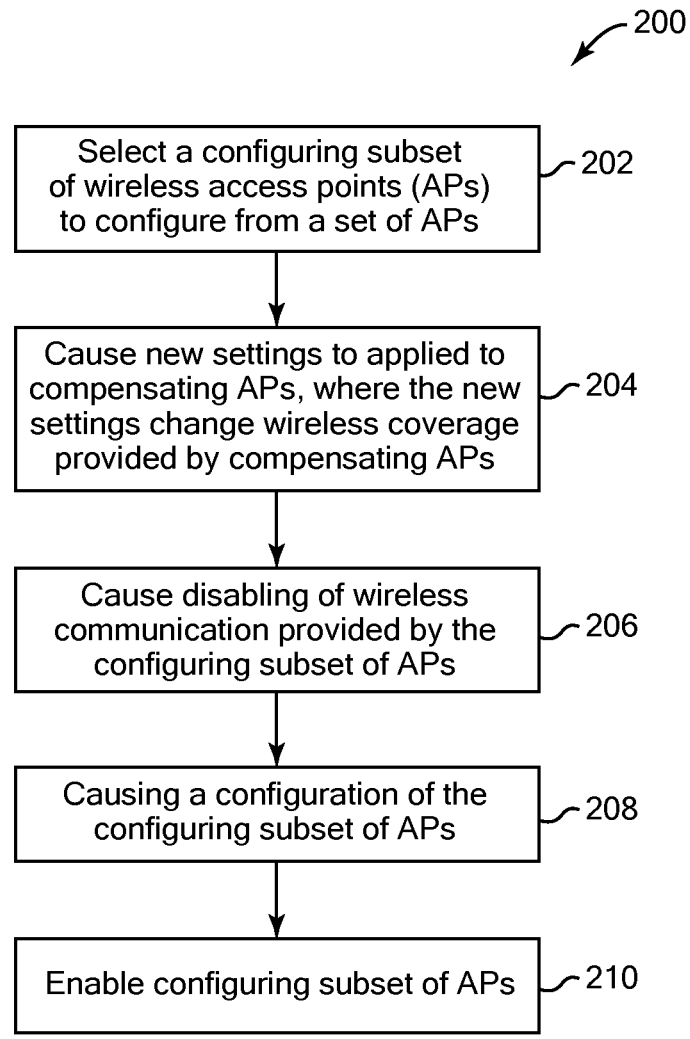
FIG. 2 is a flow diagram illustrating an example method for configuring wireless access points according to implementations disclosed herein.

FIG. 2 is a flow diagram illustrating an example method 200 for configuring wireless access points enabling uninterrupted wireless service to client devices. In some implementations, method 200 can be performed in whole or in part by one or more devices of a network, such as a wireless network controller 110 as described above with reference to FIG. 1.

In block 202, the method selects a subset of wireless access points to configure from a set of multiple wireless access points of a communication network. For example, a particular subset of access points can be selected so as to allow uninterrupted wireless service to any connected client devices via the unselected wireless access points. Some examples of selecting such a subset are described below with respect to FIG. 3.

In block 204, the method causes new settings to be applied to unselected wireless access points ("compensating wireless access points") that are not included in the subset determined in block 202. The new settings can be determined according to a wireless coverage plan, and change a physical wireless coverage provided by the compensating wireless access points to at least partially compensate for the pending disabling of wireless communication provided by the configuring subset of access points. Some examples of such settings are described below with respect to FIG. 3.

In block 206, the method causes a disabling of wireless communication provided by the subset of wireless access points being configured. In block 208, the method causes a configuration of this disabled set of wireless access points. As referred to herein, "configuration" of a wireless access point can include any of a variety of different modifications in the operation of that access point and cause the wireless network communication provided by that access point to discontinue. For example, a configuration can include one or more of installing new software on the configuring access points, applying new parameters or settings on the configuring access points, restarting the configuring access points, etc.

In block 210, the method enables (restores) the disabled subset of access points so that they again are operative to provide wireless communication. In some implementations, the compensating access points are also set back to their previous settings. This allows the original coverage of wireless network communication to be provided by the wireless access points. In some implementations, the method can return to block 202 to repeat the configuration for a different subset of wireless access points, e.g., until all desired wireless access points of the network are configured, as described below.

Figure 3:
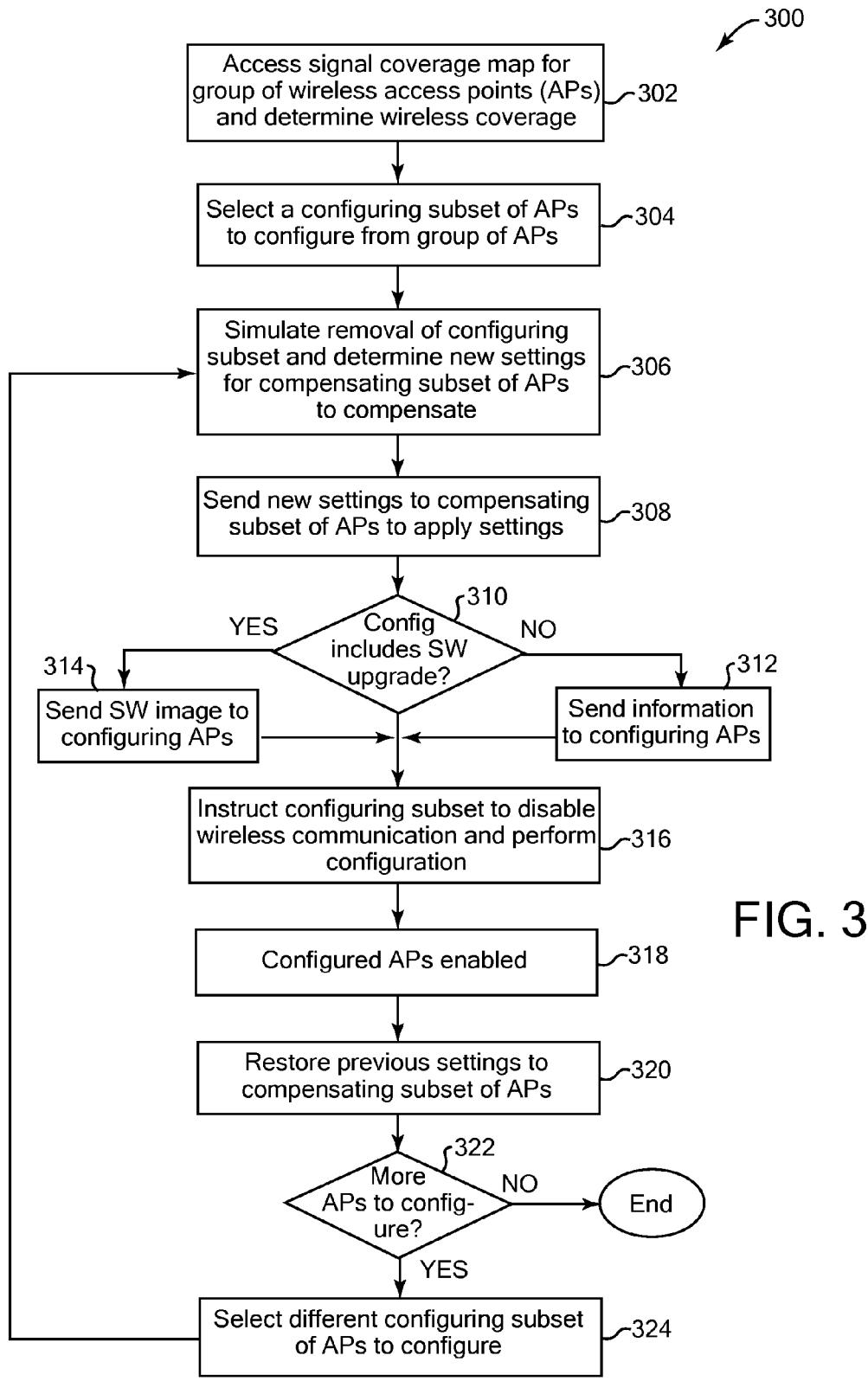
FIG. 3 is a flow diagram illustrating another example method for configuring wireless access points according to implementations disclosed herein.

FIG. 3 is a flow diagram illustrating another example method 300 for configuring wireless access points enabling uninterrupted wireless service to client devices. In some implementations, method 300 can be implemented by a wireless network controller 110 or other network-connected device similarly as method 200 described above with reference to FIG. 2.

Method 300 can be initiated in response to determining that wireless access points of the network should be configured. The method can be initiated in any of a variety of ways. For example, a wireless controller can automatically determine that wireless access points need configuring by detecting an old version of software running on the access points, detecting undesirable parameters or settings on the access points, etc. In some implementations, a user such as an administrator can command the configuration.

In block 302, the method accesses a signal coverage map for a group of wireless access points and determines the existing, original physical coverage of wireless communication signals provided by the access points. This physical coverage indicates the physical spatial area within which a client device can communicate with one or more of the access points in the group, where a client device outside that area can only intermittently communicate, communicate at a signal strength below a predetermined threshold, and/or not be able to communicate with any access points of the group.

The signal coverage map can indicate the coverage of each individual wireless access point in the group of access points as well as the total coverage of the group of access points. For example, the coverage map can indicate this information in a spatial manner, such as an overhead diagram or view of an area. Other types of information can also or alternatively be used, such as numerical set of data indicating the size of the areas of coverage of each access point and spatial locations (e.g., using spatial coordinates) of that coverage. The signal coverage map thus indicates how the individual physical coverages of the access points overlap with each other and the total extent of coverage provided by the group.

A signal coverage map can be stored in a storage device accessible to the wireless controller. In some implementations, the coverage map can be determined by a wireless controller or other device based on information sent by wireless access points. For example, as described above, various wireless access points may periodically scan for signals and report any neighboring access points to its associated controller 110, including information such as the communication channels and power used by neighboring access points. In some implementations, a controller 110 can derive a map for the entire network by obtaining information about other, non-associated access points from other controllers 110.

Figure 4:
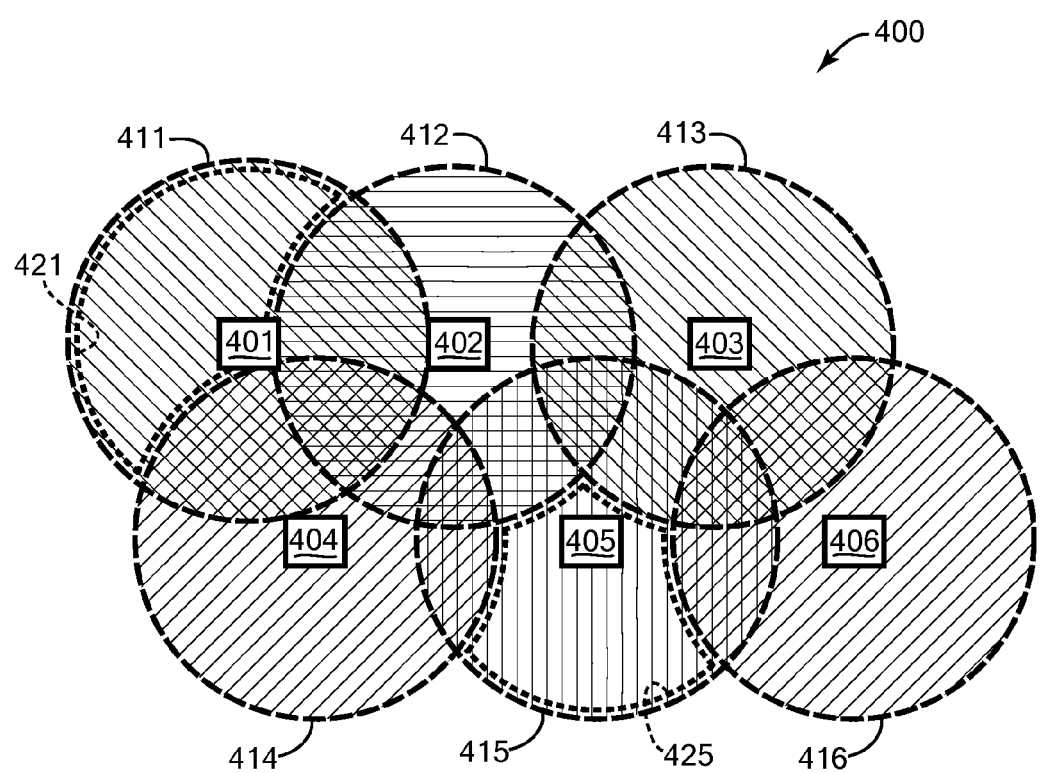
FIG. 4 is a diagrammatic illustration of an example wireless signal coverage map for a group of wireless access points.

In one example, FIG. 4 shows a sample signal coverage map 400 that can be used for some implementations described herein. For example, the coverage in map 400 can indicate the radio frequency (RF) signal range (transmitting and receiving) for each access point. A group of six access points 401, 402, 403, 404, 405, and 406 are indicated at particular spatial locations on the map, which represents an actual spatial positioning of the access points in a physical area. The wireless signal spatial coverage for each access point 401, 402, 403, 404, 405, and 406 is indicated by a coverage area 411, 412, 413, 414, 415, and 416, respectively.

Referring back to FIG. 3, in block 304 the method selects a subset of the wireless access points from the group of access points, where the selected access points are to be configured (this selected subset is also referred to herein as the "configuring subset" of access points). In some cases the configuration can include upgrading software (such as firmware) running on the access point, such as installing a newer or different version of existing software running on the access point, or installing different software. In some cases, the configuration can include setting new operating parameters, settings, and/or preferences of the access point. In many implementations, the configuration requires that the access point restart (e.g., reset or reboot) so that the configuration settings take effect on the access point. In some implementations, the configuration of the access point can simply be a restart of the access point without any new parameters or settings to take effect. For example, the access point can be restarted to restore standard settings after a crash or error of the access point, or to maintain optimal or efficient operation of the access point before a crash or error occurs. In other implementations or cases, the configuration can include other types of modification to the access point that require wireless communication to be disabled on the configuring access points during the configuration.

In the selection of a configuring subset in block 304, particular access points of the group are selected to be in the subset and other access points are not selected. This allows hitless, uninterrupted wireless service to any client devices connected to the wireless network. For example, in some implementations, access points of the group are selected such that immediate signal neighbors are not both included in the configuring subset, e.g., wireless access points having immediately-neighboring wireless physical coverages are not both included in the configuring subset. For example, such immediate neighbors can be access points having wireless coverage areas that overlap each other in area by an amount over a predetermined threshold amount. In another example, an adjacency matrix of access points can be previously created and used in block 304 to determine immediate neighbors. For instance, a first access point can be considered adjacent (i.e., a neighbor) to a second access point if the wireless signal strength from the first access point is above a configurable threshold strength as seen by the second access point. The adjacency matrix is prepared to indicate each neighbor to each access point in the group. The method can use this adjacency matrix in block 304 to identify the configuring subset of access points such that none of the access points in this subset are adjacent to each other.

By not selecting both immediate neighbors, the method allows one or more neighboring access points to remain operating during configuration to provide compensating coverage for the "hole" in wireless coverage created by the disabling of the configuring access point during configuration. A small enough hole in coverage can be created so that the non-configuring access points can typically compensate.

In the example coverage map 400 of FIG. 4, the selected access points to be included in the configuration subset can include a variety of different combinations of the access points 401-406. In one example, the access points 402 and 405 can be included in the configuring subset. These access points are not neighbors to each other, while the other access points are neighbors to one or both of these access points 402 and 405 and are excluded from the subset. For example, the access points 402 and 404 are neighbors to access point 401, and the access points 402, 403, and 406 are neighbors to access point 405. In other example configuration subsets, various other non-neighboring access points can be selected, such as the access points 401 and 406, access points 401 and 403, access points 402 and 406, or access points 403 and 404.

In some implementations, the method can determine which non-neighboring access points to include in the subset based on various additional criteria. For example, the criteria can include performing the fewest iterations of method 300 to configure all of the access points in the group (described in greater detail below), selecting particular access points first which are the most important access points in the group as indicated by stored preferences or settings set by an administrator, etc.

In block 306, the method simulates the removal or disabling of the selected (configuring) subset of access points from the group and the resulting wireless signal coverage of the group of access points, and determines a new wireless coverage plan (e.g., a new RF plan) including new settings for one or more of the other, non-configuring wireless access points in the group that are not included in the configuring subset. The particular access points receiving the new settings can also be referred to herein as a "compensating subset" of access points or "compensating access points." The new settings are determined to cause the compensating access points to compensate for any holes in wireless communication coverage caused by the disabling and effective removal of the configuring subset of access points during their configuration. The holes in coverage are physical areas in which wireless communication cannot be effectively performed by client devices, or in which wireless communication is reduced below a threshold signal strength, caused by the disabling of the configuring access points. In some cases or implementations, all of the non-configuring access points in the group of access points may be compensating access points. In other cases or implementations, only some of the non-configuring access points need to be compensating access points to cover the holes in wireless coverage (e.g., only the non-configuring access points near the configuring access points may need to receive the new settings in order to compensate adequately for holes in coverage).

The simulation of the wireless coverage during removal of the configuring subset, and determining of the new settings, can be performed in the background (e.g., by the wireless controller or other connected device) during and without affecting normal wireless operation of the access points and wireless network. The simulation can assume that the wireless communication service of the configuring subset is permanently disabled and uses the existing settings of all the non-configuring access points to determine the resulting coverage that indicates any holes in wireless signal coverage. For example, a channel and power simulation can be run based on the frequency channels, signal strength (power), and any other pertinent settings of the access points outside the configuring subset.

Once the holes in coverage are determined, the method can determine the new plan that provides new settings needed to compensate for the holes and cause one or more of the non-configuring access points to cover for the removed configuring access points. In one example, this can be performed by adjusting compensating settings of some or all non-configuring access points and running another simulation to determine the new wireless coverage, in an iterative fashion.

For example, the determined new settings for the compensating subset of access points can include various settings that adjust the wireless coverage of the compensating subset. In some examples, the new settings can include new signal power settings and new operating communication channel settings for the compensating subset. New power settings can in some cases include a power boost, e.g., an increase in the transmitted signal power or strength of one or more of the compensating access points, which extends the wireless signal range to cover and compensate for the removed access points. New communication channel settings can be used to change the frequency band used by one or more compensating access points, if needed. In some examples of the wireless networking standard 802.11, for example, a 5 GHz band and a 2.4 GHz band can be used, and each of these bands can be subdivided into multiple communication channels of smaller frequency ranges. In one example, if a power boost for signals of a compensating access point would cause its signals to interfere with signals from one or more other nearby (non-configuring and/or configuring) access points, then it may be appropriate to change the channel of that compensating access point to a different, non-interfering channel in a different frequency band or range.

In one example with reference to FIG. 4, the access points 401 and 405 are selected to be configured, i.e., they are in the configuring subset, while the other access points are not included. After a simulation in which the access points 401 and 405 are removed, it may be determined that certain non-overlapping coverage areas of these access points are holes in the coverage, e.g., are not being provided with adequate wireless service. For example, the hole areas 421 and 425 may no longer have wireless coverage. In response, the method determines to boost the signal power levels of access points 402 and 404 to cover the hole area 421, and boost the signal power levels of access points 402, 403, 404, and 406 to cover the hole area 425. The access points 402, 403, 404, and 406 therefore can be compensating access points included in the compensating subset. In addition, one or more of these compensating access points may also be changed to operate on a different wireless channel if any interference between wireless signals may occur due to the changed power levels. For example, if the boosted signals from wireless access point 406 now may interfere with boosted signals from access point 402 and/or 404, then the channel used by access point 406 can be changed. In an alternate setting scheme, the signal power of only some of the compensating access points 402, 403, 404, and 406 can be boosted while leaving the signal power of others of these access points at their original or previous settings, e.g., if the coverage hole can be adequately compensated by boosting signal power on only some of these access points.

In block 308, the method sends the determined new settings to the compensating access points to cause these settings to be applied to those access points. For example, this can cause the compensating access points to change their transmitted power (signal strength), change a communication channel to a different frequency band, and/or perform other changes in settings to provide the compensating wireless signal coverage as described above. In some implementations, a compensating access point can announce changes to other compensating access points. For example, an access point can announce a target channel which triggers associated clients (e.g., on the same network or VLAN) to also change to the target channel. In typical implementations, channel and power changes do not cause any downtime in the wireless communication to client devices.

In block 310, the method checks whether the configuration includes a software upgrade. In some cases as described above, the configuration of the configuring subset of access points may include a software upgrade, e.g., a changed or updated software image which is to replace existing software running on the configuring access points. If such an upgrade is not taking place, then in block 312, the method sends any needed information to the configuring access points. For example, other types of configurations can be performed which require the access points (or the radio on the access points) to reset for the parameters and/or settings to take effect, thus requiring client devices to become disconnected or disassociated with the access points. Such configuration can include sending new parameters and/or settings to the configuring access points. In one example, radio parameters may be sent to the configuring access points (or the radio parameters may have been received by the configuring access points from another source) which require the radio of the access point to reset and any connected client devices to disassociate with the access point. In another example, one of multiple sub-networks may be desired to be deleted or removed from the network 101, and/or a new, additional network may be desired to be instantiated on the configuring access points, and the access points (and/or their radios) may be required to restart or reset to initiate the new network configuration. Other configuration examples that can require connected client devices to be dissociated and re-associated, causing downtime, include changing radio bandwidth on an access point (e.g., increasing or decreasing bandwidth by a particular frequency amount), or changing to a different radio mode on the access point (e.g., 802.11a, 802.11a/n, 802.11n, or 802.11ac modes). In some cases, no information is sent to the configuring access points in block 312. After block 312, the method continues to block 316, described below.

If a software upgrade is occurring in block 310, then in block 314 the method sends (or causes to be sent) a software image to the configuring access points to install. For example, the wireless controller can send the software image on the appropriate access point control connections 112, or can command the configuring access point to download a software image from another device and store it in storage local to the access point, e.g., in non-volatile memory. Thus, another feature of some implementations described herein is the ability to cause selected access points to download a software image, where the selected access points can be selected based on a wireless coverage plan as described above. In some implementations, the configuring access points may already have the software image downloaded or loaded in their storage, in which case the downloading can be omitted. The method then continues to block 316.

In block 316, the method instructs the configuring subset of access points to disable their wireless communication for clients and to perform the configuration. In various implementations, the controller can a single command, or can send separate commands to disable and then to configure. For example, the configuring access points can be sent commands or instructions from the associated wireless access controller 110 to gradually fade their wireless signals to zero signal strength, thus disabling their wireless communication service, and then perform the configuration. The gradual fading of signal power provides time for client devices using these wireless signals to search for and connect to other, stronger signals provided by non-configuring access points, thus providing a seamless transition in connecting to other access points and continuous wireless service to the client devices without disruption in client data traffic.

Based on the instructions of block 316, the configuring subset of access points is configured. The configuring access points disable their wireless communication signals as instructed in block 316 and then perform the configuration. In the case of upgrading software, for example, the configuring access points can install the received software image of block 314 and restart themselves to finish the install. In some cases, new parameters or settings are loaded on the configuring access points and the configuring access points are restarted to apply the parameters and settings. In some implementations or cases, some of the configuration can be performed while the configuring access points maintain wireless communication service for clients, but at some point the wireless communication is disabled, e.g., for performing a restart, and/or other functions requiring such disablement.

In block 318, the configuring subset of access points is enabled. For example, this can occur after a restart of the configuring access points, where the access points can automatically search for the wireless controllers after restart, associated with the wireless controllers, and receive any needed commands and/or parameters, after which they are ready to provide wireless service to client devices. In some cases or implementations, the wireless controller can send one or more commands to enable the wireless communication of these access points. The configuring subset of access points are enabled at their original settings before configuration, e.g., with the same power and channel settings, except for any settings the configuration has changed.

In block 320, the method restores the previous settings to the compensating subset of access points. For example, commands can be sent from the controller to the compensating access points to restore these previous settings. The previous settings can in some implementations be saved by the controller or access points and need not be re-simulated or determined. This causes the original wireless signal coverage to be provided by the entire group of wireless access points (unless such coverage was changed by the configuration).

In block 322, the method checks whether there are more wireless access points of the group to configure. In some implementations, all of the wireless access points in the group are desired to be configured, and so this check would be true if any access points have not yet been configured. In other implementations, only some of the access points in the group are desired to be configured while other access points may not need configuration, and this block would be true if any of the desired access points have not yet been configured. If there are no further access points to configure, the process ends.

If there are more access points to configure, then in block 324 the method selects a different subset of the wireless access points to configure, and the method returns to block 302 and/or 306 to perform another simulation with the new configuring subset removed and determine new settings for compensating access points as described above. The different access points can be selected similarly as described above for block 304, e.g., to include access points that are not immediate neighbors to each other. Method 300 can thus be iteratively performed to configure multiple subsets of access points while maintaining wireless service to client devices during all of the configuration activity.

In the continuing example of FIG. 4, if the configuring subset included the access points 401 and 405 in the first iteration, then at block 324 the next configuring subset of access points can be selected, which are different from the access points 401 and 405 in the first configuring subset. For example, the access points 402 and 406 can be selected since they are not immediate neighbors and then configured. In a third iteration, the final configuring subset can include the last unconfigured access points 403 and 404, which are similarly not immediately neighboring. Other selections of access points to include in the iterations of configuring subsets can be made in alternate scenarios. For example, if access points 401 and 406 are selected as the initial configuring subset, then the next iteration can select one of the other access points as the next configuring subset. Thus, if the remaining access points are immediate neighbors, then each access point can be selected as a single access point in the configuring subset and configured in turn.

Some configuring subset selection combinations may lead to a lesser number of iterations than other selection combinations, and in some implementations the method can take this into account and making selections for the configuring subsets that minimize the number of configuring iterations of method 300. Furthermore, some implementations can determine that more iterations of configuration than initially estimated may be needed and can adjust the particular access points in a subset. For example, the method may determine (e.g., via detection by access points) that a previous iteration did not provide as effective compensating wireless coverage as initially estimated. If so, the number of configuring access points in later iterations can be reduced, and/or different access points can be selected for the configuring subset, to allow more effective wireless service compensation by non-configuring access points.

Implementations described herein allow hitless wireless service to be provided during configuration of the wireless access points of the wireless network. This offers benefits to any wireless network, especially networks having many access points. For example, many moderate to large deployments of access points are dense deployments with more than one access point covering the same physical area, to support redundancy and sufficient bandwidth for clients. Thus, it is quite likely that other access points not included in the configuring subset can be adjusted to cover for coverage holes created by the configuring subset as described herein.

Features described herein provide a more continuous and stable wireless service for client devices, allowing client connectivity loss to be eliminated or reduced during access point configuration. Previous systems could upgrade a portion of the available wireless access points in multiple cycles, e.g., as a percentage of the available access points in each cycle, but this method was applied with no coverage plan, such as by choosing access points randomly or based on network addresses of the access points. No compensating wireless service in coverage holes was consistently provided during upgrades. Thus, downtime of the wireless network was assumed and scheduled. However, with wireless networking becoming a primary access medium in many venues and applications, such downtime is greatly undesirable, and the plan-assisted configuration features for wireless access points allowing reduced downtime as described herein become even more important.

It should be noted that in the methods 200 and 300, the order of blocks shown is not the only order in which these blocks can be performed, and the blocks can be performed in different orders and/or at least partially simultaneously where appropriate. For example, the blocks 310, 312, and 314 can be processed at different times during the method. In addition, different portions of a whole wireless network can be independently configured using methods 200 or 300 at the same time, e.g., if such portions are not within each other's wireless coverage areas.

Methods 200 and 300 can be implemented by program instructions or code, which can be implemented by one or more processors of the network device such as microprocessors or other processing circuitry, and can be stored on a computer program product including a data storage, memory and/or non-transitory computer readable medium, such as a magnetic, optical, electromagnetic, or semiconductor storage medium, including semiconductor or solid state memory, a random access memory (RAM), a read-only memory (ROM), flash memory, a rigid magnetic storage device (e.g., hard disk), an optical storage device (e.g., CD, DVD), a solid-state memory drive, etc. The program instructions can also be contained in, and provided as, an electronic signal, for example in the form of software as a service (SaaS) delivered from a server (e.g., a distributed system and/or a cloud computing system). Alternatively, method 200 can be implemented in hardware (logic gates, etc.), or in a combination of hardware and software.

Figure 5:
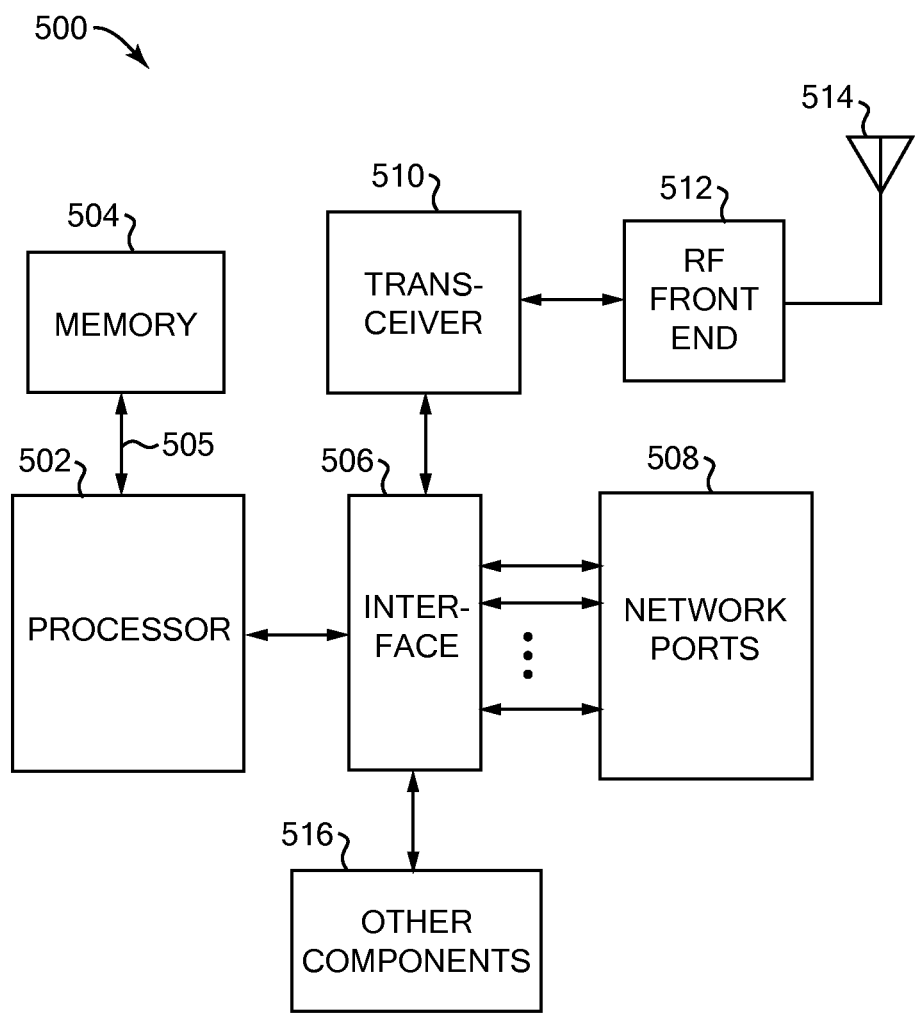
FIG. 5 is a block diagram of an example device which can be used in some implementations described herein.

FIG. 5 is a block diagram of one example of a device 500 which can be used with features described herein. Device 500 can be, for example, a wireless controller 110 as shown in the example of FIG. 1, or other type of network device such as wireless access point 104, etc. In a basic configuration, device 500 typically includes one or more processors 502 and a system memory 504. A memory bus 505 can be used for communicating between processor 502 and system memory 504.

Depending on the desired configuration, processor 502 can be of any type of processing circuitry including but not limited to one or more microprocessors, microcontrollers, digital signal processors (DSPs), application specific integrated circuits (ASICs), or any combination thereof. In some examples, processor 502 can include one more levels of caching, a processor core, and registers. An example processor core can include an arithmetic logic unit (ALU), a floating point unit (FPU), a digital signal processing core (DSP), or any combination thereof. A memory controller can also be used with processor 502, or in some implementations memory controller can be an internal part of processor 502.

System memory 504 can store data used in the operation of the device 500. For example, device 500 can be a wireless access controller 110 and system memory 504 can store an operating system for the controller, one or more applications for the controller, and program data. In some implementations, the memory 504 can store software operative to perform network device functionality as well as read the instructions sent by an administrator or other user to the device and perform other functions as described above, including reading and executing commands and parameters, receiving information from associated wireless access points, and performing blocks of methods 200 and/or 300 using one or more processors. For example, access point profiles a providing configurations for wireless access points, and/or software images and/or parameters for sending to be installed on access points, can be stored in memory 504. Furthermore, a signal coverage map can be stored in memory 504 representing the wireless coverage of associated wireless access points in the network, and/or all access points in the network. Alternatively, the software can be implemented as hardware or a combination of hardware and software. Memory 504 can be implemented as one or more of various types, volatile and/or non-volatile, including RAM, ROM, EEPROM, flash memory or other memory technology, etc.

An interface 506 can be used to interface the processor 502 with other functional components of the device 500. Such other components can include network ports 508 of the device 500 which are connected to other devices on the network to allow communication of data to and from other network devices. For example, Ethernet, Universal Serial Bus (USB), or other types of ports can allow wired network communication to the device 500. A transceiver 510 can be connected to interface 506 to allow transmission and reception of wireless signals at the device 500. For example, an RF front end 512 and antenna 514 can allow transmission and reception of wireless RF signals, as well as conversion between analog signals used in the wireless communication and digital signals used by the device 500. Signals of other frequencies can be communicated in other implementations.

Additional components 516 can also be connected to interface 506. For example, storage devices can be connected to the interface 506, such as CD-ROM, DVD, or other optical storage, magnetic tape storage, magnetic disk storage or other magnetic storage devices, solid state memory storage, or any other medium which can be used to store the desired information and which can be accessed by device 500. Any such computer storage media (including memory 504) can be part of or accessible by device 500. Example computer storage media can include volatile and nonvolatile, removable and non-removable media implemented in any method or technology for storage of information, such as computer readable instructions, data structures, program modules, or other data.

The illustrative implementations described in the detailed description, drawings, and claims are not meant to be limiting or restrictive. Other implementations may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein. The functional blocks, features, methods, devices, and systems described in the present disclosure may be integrated or divided into different combinations of systems, devices, and functional blocks as would be known to those skilled in the art.

What is claimed is:

1. A method comprising:
   selecting, from a plurality of wireless access points in a communication network, a configuring subset of wireless access points and a different compensating subset of wireless access points;
   causing new settings to be applied to the compensating subset of wireless access points, wherein the new settings change a physical coverage of wireless communication provided by the compensating subset of wireless access points to at least partially compensate for a disabling of wireless communication provided by the configuring subset of wireless access points,
   wherein the new settings include:
     one or more new signal power settings for at least one of the wireless access points in the compensating subset of wireless access points, wherein the one or more new signal power settings cause an increase in transmitted signal power of one or more of the wireless access points in the compensating subset of wireless access points to at least partially compensate for the disabling of wireless communication; and
     one or more new communication channels for operation of at least one of the wireless access points in the compensating subset of wireless access points, wherein the one or more new communication channels operate at one or more new frequency bands to at least partially compensate for the disabling of wireless communication and to at least partially compensate for the one or more new signal power settings;
   causing the disabling of wireless communication provided by the configuring subset of wireless access points; and
   causing a configuration of the disabled configuring subset of wireless access points to be performed.

2. The method of claim 1 wherein the configuring subset of wireless access points is selected such that only one wireless access point of each set of immediately-neighboring wireless access points is included in the configuring subset.

3. The method of claim 1 further comprising determining which of the wireless access points are immediate neighbors to each other based on determining which wireless physical coverage areas overlap each other by an amount over a threshold amount, and wherein
   selecting the configuring subset of wireless access points includes omitting one or more wireless access points that are immediate neighbors of one or more other wireless access points included in the configuring subset of wireless access points.

4. The method of claim 3 further comprising accessing a signal coverage map to determine the wireless physical coverage areas provided by the plurality of wireless access points using settings different than the new settings, wherein the signal coverage map is determined at a wireless controller based on information provided by one or more of the plurality of wireless access points based on scans of wireless access points neighboring one or more of the plurality of wireless access points.

5. The method of claim 1 wherein causing new settings to be applied includes sending the new settings from a wireless access point controller to the compensating subset of wireless access points via a connection separate from wireless channels used to communicate wireless data traffic.

6. The method of claim 1 further comprising determining which of the wireless access points are immediate neighbors to each other, wherein one or more first wireless access points are determined to be immediate neighbors to one or more respective second wireless access points based on one or more wireless signals from the one or more first wireless access points having strengths above a threshold amount as detected by the one or more respective second wireless access points; and
   selecting the configuring subset of wireless access points includes omitting one or more wireless access points that are immediate neighbors of one or more other wireless access points included in the configuring subset of wireless access points.

7. The method of claim 1 wherein causing new settings to be applied includes determining the new settings by simulating the disablement of the wireless communication of the configuring subset of wireless access points, determining the loss of physical coverage caused by the simulated disablement, and determining a compensation by the compensating subset of wireless access points.

8. The method of claim 1 wherein causing a disabling of wireless communication provided by the configuring subset of wireless access points includes gradually fading the power level of wireless signals provided by the configuring subset of wireless access points to allow one or more client devices connected to the configuring subset to connect to one or more of the compensating subset of wireless access points during the fading.

9. The method of claim 1 wherein causing the configuration of the disabled configuring subset to be performed includes causing a restart of the wireless access points in the disabled configuring subset.

10. The method of claim 1 further comprising sending a software upgrade to the wireless access points in the configuring subset.

11. The method of claim 1 wherein causing the configuration of the disabled configuring subset includes causing a reset of the wireless access points in the disabled configuring subset to cause new parameters to be applied to the wireless access points in the disabled configuring subset.

12. The method of claim 1 further comprising causing previous settings, different than the new settings, to be applied to the compensating subset of wireless access points after the configuring subset of wireless access points has been configured.

13. The method of claim 1 further comprising:
determining a new configuring subset of wireless access points from the plurality of wireless access points, the new configuring subset including none of the wireless access points in the configuring subset;
determining a new compensating subset of wireless access points that are not included in the new configuring subset; and
repeating for the new configuring subset and the new compensating subset, the causing of new settings to be applied, the causing of a disabling of wireless communication, and the causing of a configuration.

14. A computer program product comprising a non-transitory computer readable medium including program instructions to be implemented by a device connected to a communication network, the program instructions for:
accessing a signal coverage map to determine physical coverage areas of wireless communication provided by a plurality of wireless access points in the communication network using particular settings, wherein the signal coverage map is based on information provided by one or more of the plurality of wireless access points based on scans of wireless access points neighboring at least one of the plurality of wireless access points;
determining which of the wireless access points are immediate neighbors to each other, wherein determining which of the wireless access points are immediate neighbors includes determining that the physical coverage areas of the immediate neighbors overlap each other by an amount over a threshold amount;
selecting, from the plurality of wireless access points, a configuring subset of wireless access points and a different compensating subset of wireless access points, wherein the plurality of wireless access points are connected to the communication network, wherein the configuring subset of wireless access points is selected to omit one or more wireless access points that are immediate neighbors of one or more other wireless access points included in the configuring subset of wireless access points;
causing new settings to be applied to the compensating subset of wireless access points, wherein the new settings change the physical coverage of wireless communication provided by the compensating subset of wireless access points to at least partially compensate for a disabling of wireless communication provided by the configuring subset of wireless access points, wherein the new settings include one or more of:
a new signal power setting for at least one of the wireless access points in the compensating subset of wireless access points that causes an increase in transmitted signal power of one or more of the wireless access points in the compensating subset of wireless access points; and
a new communication channel setting that causes at least one of the wireless access points in the compensating subset of wireless access points to operate at a new frequency band;
causing the disabling of wireless communication provided by the configuring subset of wireless access points; and
causing a configuration of the disabled configuring subset of wireless access points to be performed.

15. The computer program product of claim 14 wherein one or more first wireless access points of the plurality of wireless access points are determined to be the immediate neighbors to one or more respective second wireless access points of the plurality wireless access points based on one or more wireless signals from the one or more first wireless access points having strengths above a threshold amount as detected by the one or more respective second wireless access points.

16. The computer program product of claim 14 further comprising:
causing previous settings, different than the new settings, to be applied to the compensating subset of wireless access points after the configuring subset of wireless access points has been configured;
determining a new configuring subset of wireless access points from the plurality of wireless access points, the new configuring subset including none of the wireless access points in the configuring subset;
determining a new compensating subset of wireless access points that are not included in the new configuring subset; and
repeating for the new configuring subset and the new compensating subset, the causing of new settings to be applied, the causing of a disabling of wireless communication, and the causing of a configuration.

17. The computer program product of claim 14, wherein causing new settings to be applied includes determining the new settings by simulating disablement of wireless communication of the configuring subset of wireless access points;
determining loss of physical coverage caused by the simulated disablement; and
determining a compensation by the compensating subset of wireless access points.

18. A device comprising:
a memory; and
at least one processor operative to access the memory and perform operations comprising:
determining, in a plurality of wireless access points in the communication network, which of the wireless access points are immediate neighbors to each other, wherein one or more first wireless access points are determined to be the immediate neighbors to one or more respective second wireless access points based on one or more wireless signals from the one or more first wireless access points having strengths above a threshold amount as detected by the one or more respective second wireless access points;
selecting, from the plurality of wireless access points, a configuring subset of wireless access points and a different compensating subset of wireless access points, wherein the plurality of wireless access points are connected to a communication network, wherein the configuring subset of wireless access points is selected to omit one or more wireless access points that are immediate neighbors of one or more other wireless access points included in the configuring subset of wireless access points;
causing new settings to be applied to the compensating subset of wireless access points, wherein the new settings change a physical coverage of wireless communication provided by the compensating subset of wireless access points to at least partially compensate for a disabling of wireless communication provided by the configuring subset of wireless access points, wherein the new settings include one or more of:

a new signal power setting for at least one of the wireless access points in the compensating subset of wireless access points that causes an increase in transmitted signal power of one or more of the wireless access points in the compensating subset of wireless access points; and a new communication channel setting that causes at least one of the wireless access points in the compensating subset of wireless access points to operate at a new frequency band;

causing the disabling of wireless communication provided by the configuring subset of wireless access points; and causing a configuration of the disabled configuring subset of wireless access points to be performed.

19. The device of claim 18 further comprising:

accessing a signal coverage map to determine physical coverage areas of wireless communication provided by a plurality of wireless access points in the communication network using particular settings, wherein the signal coverage map is based on information provided by one or more of the plurality of wireless access points based on scans of wireless access points neighboring at least one of the plurality of wireless access points, wherein determining which of the wireless access points are immediate neighbors additionally includes determining that the physical coverage areas of the immediate neighbors overlap each other by an amount over a threshold amount.

20. The device of claim 18, wherein causing new settings to be applied includes:

determining the new settings by simulating disablement of wireless communication of the configuring subset of wireless access points;

determining loss of physical coverage caused by the simulated disablement; and determining a compensation by the compensating subset of wireless access points.

* * * * *